(12) United States Patent
Kloss

(10) Patent No.: US 11,166,498 B1
(45) Date of Patent: Nov. 9, 2021

(54) ILLUMINATION GARMENT

(71) Applicant: Charles Kloss, Beaverton, OR (US)

(72) Inventor: Charles Kloss, Beaverton, OR (US)

(*) Notice: Subject to any disclaimer, the term of this patent is extended or adjusted under 35 U.S.C. 154(b) by 0 days.

(21) Appl. No.: 17/034,462

(22) Filed: Sep. 28, 2020

(51) Int. Cl.
- A41D 13/01 (2006.01)
- A41D 1/00 (2018.01)
- A41D 1/04 (2006.01)
- F21V 33/00 (2006.01)
- A01M 29/10 (2011.01)
- F21V 23/00 (2015.01)
- F21Y 115/10 (2016.01)

(52) U.S. Cl.
CPC ............ *A41D 13/01* (2013.01); *A01M 29/10* (2013.01); *A41D 1/005* (2013.01); *A41D 1/04* (2013.01); *F21V 23/003* (2013.01); *F21V 33/0008* (2013.01); *A41D 2600/20* (2013.01); *F21Y 2115/10* (2016.08)

(58) Field of Classification Search
CPC ........ A41D 13/01; A41D 1/002; A41D 1/005; A41D 1/04; A41D 2600/20; F21V 33/0008; F21V 23/003; A01M 29/10
See application file for complete search history.

(56) References Cited

U.S. PATENT DOCUMENTS

| | | | | |
|---|---|---|---|---|
| 4,815,146 | A | * | 3/1989 | Theewis ............... A41D 13/01 2/94 |
| 10,157,590 | B1 | * | 12/2018 | Aflatooni ............... G09G 5/10 |
| 10,617,159 | B2 | * | 4/2020 | Lynch ............... F21V 33/0008 |
| 10,856,589 | B1 | * | 12/2020 | Lee ..................... A41D 27/20 |
| 2012/0063124 | A1 | | 3/2012 | Schrimmer .............. A45F 5/02 362/103 |
| 2017/0143053 | A1 | * | 5/2017 | Wright ................... G08B 5/004 |
| 2019/0037934 | A1 | * | 2/2019 | Swank ................... G08B 21/02 |
| 2019/0104777 | A1 | * | 4/2019 | Lauf ..................... A41D 13/01 |
| 2021/0068477 | A1 | * | 3/2021 | Johnson ............... A41D 13/01 |

* cited by examiner

Primary Examiner — Alan B Cariaso
(74) Attorney, Agent, or Firm — The Iwashko Law Firm, PLLC; Lev Ivan Gabriel Iwashko

(57) ABSTRACT

An illumination garment, including a main body to wear on at least a portion of a body of a user, an illumination assembly removably disposed on at least a portion of the main body to illuminate a surrounding area, and a control unit disposed on and within at least a portion of the main body to adjust at least one of a color setting and a flash setting of the illumination assembly.

5 Claims, 2 Drawing Sheets

ILLUMINATION GARMENT

BACKGROUND

1. Field

The present general inventive concept relates generally to a garment, and particularly, to an illumination garment.

2. Description of the Related Art

Night time is a time of day when light conditions are lowest, which can increase a risk of danger because the ability to see decreases. Specifically, a person traveling at night has an increased risk of receiving and/or causing injury or damage to another person, animal, or object.

A safety vest is an essential piece of equipment designed and regulated to enhance the visibility of workers in a hazardous area. However, these safety vests are mostly utilized by laborers on duty and not for everyday use. Also, the safety vests are limited to having static lighting.

Therefore, there is a need for an illumination garment that provides customizable settings to increase visibility during night conditions.

SUMMARY

The present general inventive concept provides an illumination garment.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an illumination garment, including a main body to wear on at least a portion of a body of a user, an illumination assembly removably disposed on at least a portion of the main body to illuminate a surrounding area, and a control unit disposed on and within at least a portion of the main body to adjust at least one of a color setting and a flash setting of the illumination assembly.

The illumination assembly may include a first section having a rounded rectangular shape disposed on a first side of the main body beginning on a front portion of the main body and extending in a first lateral direction to at least a portion of a rear portion of the main body, a second section having another rounded rectangular shape disposed on a second side of the main body beginning on the front portion of the main body and extending in a second lateral direction to at least a portion of the rear portion of the main body, a third section having an upside down U-shape disposed on the rear portion of the main body, such that the third section connects to the first section and the second section, and a fourth section disposed on the rear portion of the main body to connect to a first side and a second side of the third section.

The illumination garment may further include an elongated member to cover at least a portion of the illumination assembly to prevent damage to the illumination assembly.

The illumination garment may further include a UV matrix disposed on and within at least a portion of the main body to illuminate a UV light in response to detection by a sensor of a predetermined range of pressure on the main body.

The UV matrix may determine the predetermined range of pressure based on a pressure level exerted by at least one of an insect and an arachnid.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Illumination Garment 100
Main Body 110
Outer Surface 111
Inner Surface 112
Illumination Assembly 120
First Section 121
Second Section 122
Third Section 123
Fourth Section 124
Elongated Member 130
Ultraviolet Matrix 140
Control Unit 150

Figure 1:
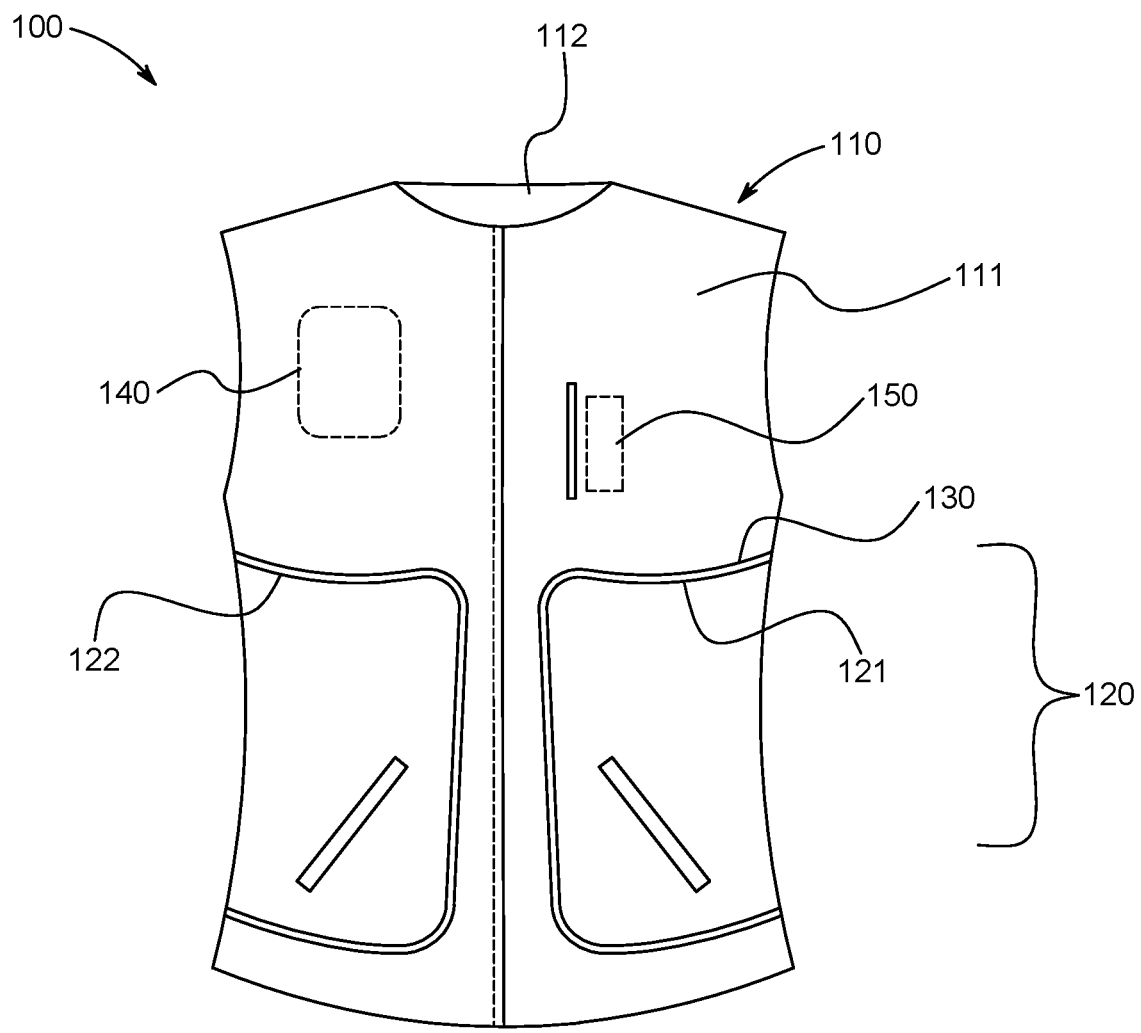
FIG. 1 illustrates a front view of an illumination garment, according to an exemplary embodiment of the present general inventive concept.

FIG. 1 illustrates a front view of an illumination garment 100, according to an exemplary embodiment of the present general inventive concept.

Figure 2:
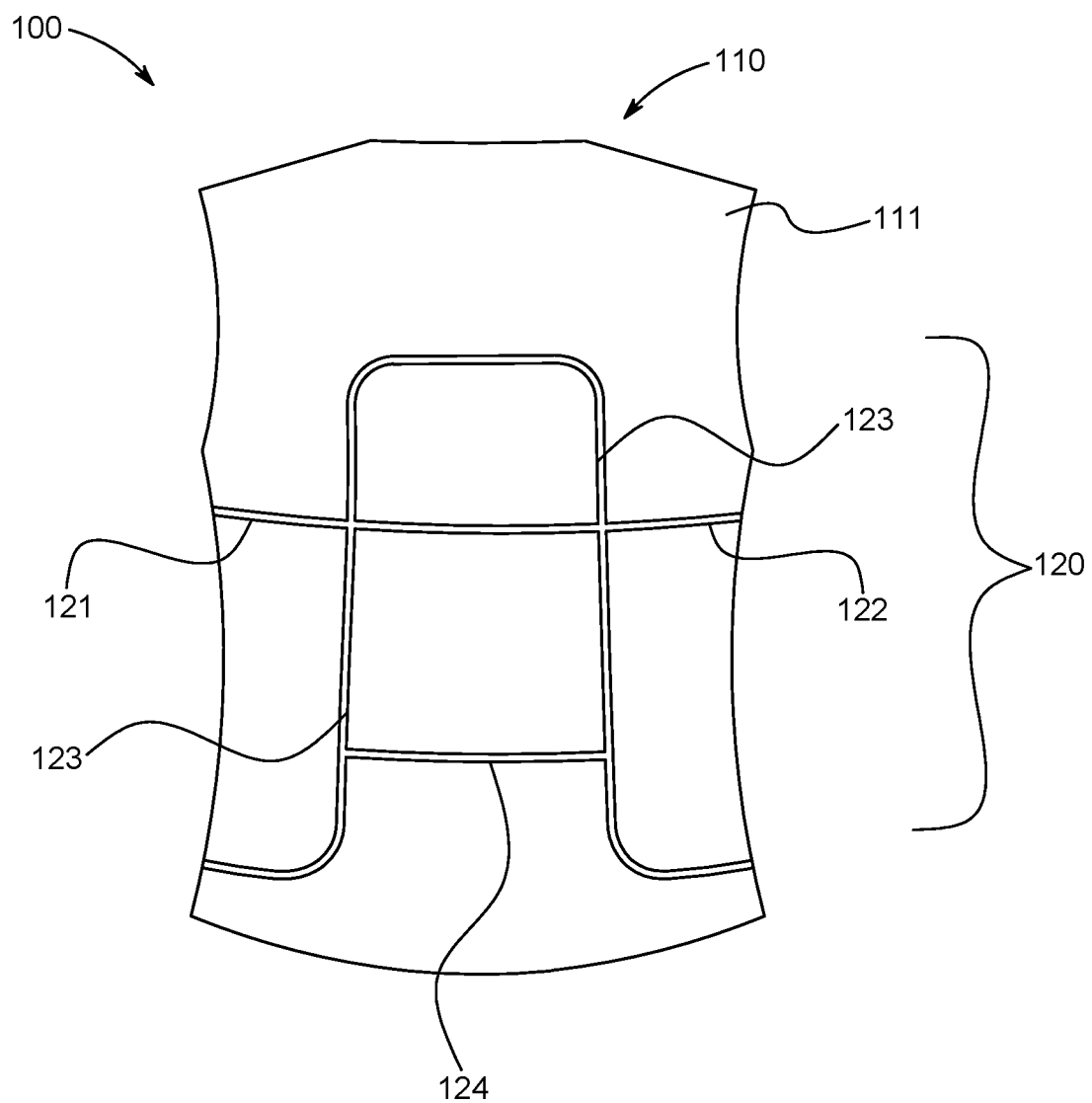
FIG. 2 illustrates a rear view of the illumination garment, according to an exemplary embodiment of the present general inventive concept.

FIG. 2 illustrates a rear view of the illumination garment 100, according to an exemplary embodiment of the present general inventive concept.

The illumination garment 100 may be constructed from at least one of metal, plastic, glass, and rubber, etc., but is not limited thereto.

The illumination garment 100 may include a main body 110, an illumination assembly 120, an elongated member 130, an ultraviolet matrix 140, and a control unit 150, but is not limited thereto.

Referring to FIGS. 1 and 2, the main body 110 is illustrated to be a vest. However, the main body 110 may be a shirt, a jacket, a blouse, and a sweater, but is not limited thereto.

The main body 110 may include an outer surface 111 and an inner surface 112, but is not limited thereto.

The main body 110 may be worn on at least a portion of a body of a user.

The illumination assembly 120 may include a first section 121, a second section 122, a third section 123, and a fourth section 124, but is not limited thereto.

The illumination assembly 120 may be constructed of electrical wiring and at least one light-emitting diode (LED). For example, the illumination assembly 120 may be a network of wires and thirty LEDs, but more or less LEDs may be used based on a preference of the user. Also, the illumination assembly 120 may use incandescent bulbs, fluorescent bulbs, and/or any other type of lighting. Additionally, the electrical wiring may be illuminated wiring, such that the electrical wiring illuminates in addition to the LEDs.

Additionally, the illumination assembly 120 may be removably disposed on at least a portion of the outer surface 111 and/or the inner surface 112 of the main body 110. The illumination assembly 120 may use any fastener to connect the illumination assembly 120 to the main body 110. For example, the illumination assembly 120 may be connected using copper ferrules. As such, the illumination assembly 120 may have different configurations and/or appearances on the main body 110 based on the preference of the user. The illumination assembly 120 may illuminate a surrounding area thereof.

Referring again to FIGS. 1 and 2, the first section 121 may form a rounded rectangular shape on a first side of the main body 110 beginning on a front portion of the main body 110 and extending in a first lateral direction to at least a portion of a rear portion of the main body 110. Similarly, the second section 122 may form another rounded rectangular shape on a second side of the main body 110 beginning on the front portion of the main body 110 and extending in a second lateral direction to at least a portion of the rear portion of the main body 110.

The third section 123 may form an upside down U-shape disposed on the rear portion of the main body 110. Moreover, the third section 123 may connect to and share a first side with the first section 121 and a second side with the second section 122.

The fourth section 124 may form a linear segment disposed on the rear portion of the main body 110. Also, a first end of the fourth section 124 may connect to the first side of the third section 123 and a second end of the fourth section 124 may connect to the second side of the third section 123.

As such, an arrangement of the first section 121, the second section 122, the third section 123, and/or the fourth section 124 may indicate a presence of the user during night time conditions.

The elongated member 130 may include a tube, but is not limited thereto.

The elongated member 130 may have predetermined dimensions. For example, the elongated member 130 may be one-quarter inch in diameter.

The elongated member 130 may cover at least a portion of the illumination assembly 120 to prevent contact to the illumination assembly 120 by an external object. In other words, the elongated member 130 may prevent damage to the illumination assembly 120 due to enclosing the illumination assembly 120 therein.

The ultraviolet (UV) matrix 140 may include a UV light and a sensor, but is not limited thereto.

The UV matrix 140 may be disposed on and/or within at least a portion of the main body 110. More specifically, the UV matrix 140 may be a thin matrix of lights disposed on and/or within the main body 110. The UV matrix 140 may illuminate in response to detection by the sensor of a predetermined range of pressure on the main body 110, such that the UV matrix 140 determines the predetermined range of pressure based on a pressure level exerted by an insect and/or an arachnid. As such, the UV matrix 140 may illuminate the UV light to eliminate and/or discourage a presence of at least one pest on the main body 110. Furthermore, the UV matrix 140 may illuminate a specific portion of the matrix corresponding to the location of the at least one pest. For example, the UV matrix 140 may illuminate a portion of the front portion of the main body 110, but not the rear portion of the main body 110.

The control unit 150 may include a light button, a first light lever, a second light lever, a battery, and a solar cell, but is not limited thereto.

The control unit 150 may be disposed on and/or within at least a portion of the main body 110. The light button of the control unit 150 may turn on the illumination assembly 120 and/or the UV matrix 140 in response to a first depress of the light button, and turn off the illumination assembly 120 and/or the UV matrix 140 in response to a second depress of the light button.

The first light lever of the control unit 150 may adjust a color setting of the illumination assembly 120. More specifically, the first light lever of the control unit 150 may be moved in a first direction or a second direction to change the color setting of the illumination assembly 120 from at least one first color to at least one second color. For example, the first light lever of the control unit 150 may have eight color settings, but is not limited thereto.

The second light lever of the control unit 150 may adjust a flash (i.e. blinking) setting of the illumination assembly 120. More specifically, the second light lever of the control unit 150 may be moved in the first direction or the second direction to change the flash setting of the illumination assembly 120 from at least one first flash speed to at least one second flash speed. For example, the second light lever of the control unit 150 may have eight flash settings, but is not limited thereto.

Furthermore, the control unit 150 may send power to the illumination assembly 120 and/or the UV matrix 140.

Therefore, the illumination garment 100 may facilitate movement during the night by the user. Also, the illumination garment 100 may allow a third party to see the user during the night due to increased visibility from the illumination assembly 120.

The present general inventive concept may include an illumination garment 100, including a main body 110 to wear on at least a portion of a body of a user, an illumination assembly 120 removably disposed on at least a portion of the main body 110 to illuminate a surrounding area, and a control unit 150 disposed on and within at least a portion of the main body 110 to adjust at least one of a color setting and a flash setting of the illumination assembly 120.

The illumination assembly 120 may include a first section 121 having a rounded rectangular shape disposed on a first side of the main body 110 beginning on a front portion of the main body 110 and extending in a first lateral direction to at least a portion of a rear portion of the main body 110, a second section 122 having another rounded rectangular shape disposed on a second side of the main body 110 beginning on the front portion of the main body 110 and extending in a second lateral direction to at least a portion of the rear portion of the main body 110, a third section 123 having an upside down U-shape disposed on the rear portion of the main body 110, such that the third section 123 connects to the first section 121 and the second section 122, and a fourth section 124 disposed on the rear portion of the main body 110 to connect to a first side and a second side of the third section 123.

The illumination garment 100 may further include an elongated member 130 to cover at least a portion of the illumination assembly 120 to prevent damage to the illumination assembly 120.

The illumination garment 100 may further include a UV matrix 140 disposed on and within at least a portion of the main body 110 to illuminate a UV light in response to detection by a sensor of a predetermined range of pressure on the main body 110.

The UV matrix 140 may determine the predetermined range of pressure based on a pressure level exerted by at least one of an insect and an arachnid.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An illumination garment, comprising:
   a main body to wear on at least a portion of a body of a user;
   an illumination assembly removably disposed on at least a portion of the main body to illuminate a surrounding area, the illumination assembly comprising:
      a first section having a rounded rectangular shape disposed on a first side of the main body beginning on a front portion of the main body and extending in a first lateral direction to at least a portion of a rear portion of the main body,
      a second section having another rounded rectangular shape disposed on a second side of the main body beginning on the front portion of the main body and extending in a second lateral direction to at least a portion of the rear portion of the main body,
      a third section having an upside down U-shape disposed on the rear portion of the main body, such that the third section connects to the first section and the second section, and
      a fourth section disposed on the rear portion of the main body to connect to a first side and a second side of the third section; and
   a control unit disposed on and within at least a portion of the main body to adjust at least one of a color setting and a flash setting of the illumination assembly.

2. The illumination garment of claim 1, further comprising:
   an elongated member to cover at least a portion of the illumination assembly to prevent damage to the illumination assembly.

3. The illumination garment of claim 1, further comprising:
   a UV matrix disposed on and within at least a portion of the main body to illuminate a UV light in response to detection by a sensor of a predetermined range of pressure on the main body.

4. The illumination garment of claim 3, wherein the UV matrix determines the predetermined range of pressure based on a pressure level exerted by at least one of an insect and an arachnid.

5. An illumination garment, comprising:
   a main body to wear on at least a portion of a body of a user;
   an illumination assembly removably disposed on at least a portion of the main body to illuminate a surrounding area;
   a control unit disposed on and within at least a portion of the main body to adjust at least one of a color setting and a flash setting of the illumination assembly; and
   a UV matrix disposed on and within at least a portion of the main body to illuminate a UV light in response to detection by a sensor of a predetermined range of pressure on the main body.

* * * * *